Patented June 27, 1939

2,164,271

UNITED STATES PATENT OFFICE 2,164,271

SECONDARY AMINOALCOHOLS

Henry B. Hass, West Lafayette, and Byron M. Vanderbilt, Terre Haute, Ind., assignors to Purdue Research Foundation, Lafayette, Ind., a corporation of Indiana No Drawing. Application August 13, 1937, Serial No. 158,955

5 Claims. (Cl. 260—584)

Our invention relates to new and useful aliphatic aminoalcohols and more particularly to secondary aminoalcohols wherein the carbon atom attached to the amino group is adjacent to the carbon atom attached to the hydroxyl group.

The aminoalcohols of our invention have been found to be of particular value for use as corrosion inhibiting agents in anti-freeze solutions. These compounds are organic bases containing free amino and hydroxy groups and various other uses for them will readily occur to persons skilled in the art.

Specifically, the aminoalcohols of our invention have the following general structural formula:

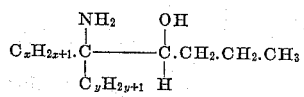

wherein $x$ represents an integer, $y$ represents zero or an integer and $x+y$ is less than four. Examples of the aminoalcohols included within the scope of our invention are the 2-amino-3-hexanols, the 3-amino-4-heptanols, and the 5-amino-4-octanols which have the following structural formulae:

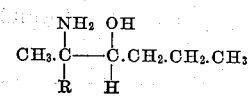

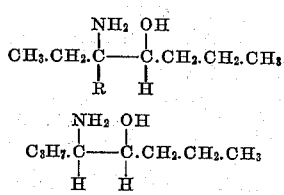

wherein R represents hydrogen or a methyl group.

These aminoalcohols may be suitably prepared by any of the known methods of reducing a nitro to an amino group provided that the conditions are not sufficiently drastic to cause splitting of the molecule. We prefer, however, to prepare these compounds by the catalytic hydrogenation of the corresponding nitro compounds in accordance with the process of our copending application Serial No. 151,841, filed July 3, 1937. According to this process the nitroalcohol is hydrogenated at atmospheric or increased pressures in the presence of a nickel catalyst in the liquid phase with or without an auxiliary solvent at temperatures under 125° C. In general, any hydrogenation catalyst may be used that is active within the temperatures employed. We prefer, however, to use a powdered nickel catalyst that is prepared in the following manner: A nickel-aluminum alloy is prepared in the powdered form, a suitable alloy containing 50% aluminum and 50% nickel. The aluminum is dissolved out of the powdered alloy by strong alkali solution, and the nickel residue is washed free from alkali and salts with water and kept under liquid. This catalyst is active at temperatures around 25° C. and may be used repeatedly without losing its activity. The hydrogenation may be carried out at hydrogen pressures varying from atmospheric pressure to over 2,000 pounds per square inch. The rate of reaction is directly proportional to the hydrogen pressures and the temperatures employed. Thus, at a hydrogen pressure of 600 pounds per square inch and at temperatures from 60 to 70° C. under the conditions we have employed, the hydrogenation will, in general, be found to be complete after a period of 15 to 45 minutes. Lower pressures and lower temperatures will in general require longer times for the hydrogenation reaction to be completed and, conversely, higher pressures and temperatures will in general shorten the time for completion of the hydrogenation reaction. Optimum pressures and temperatures may be readily determined by simple experimentation and will depend, to some extent, on the amount of catalyst and solvent employed, the surface of the reaction mixture exposed to the hydrogen, the rate of agitation, and the tendency for the nitroalcohol to decompose at higher temperatures under the conditions employed. Methyl or ethyl alcohol may be employed as solvents.

After the reaction has been effected the catalyst may be separated from the reaction mixture by any suitable means such as filtration or decantation and the aminoalcohol separated from the solution by fractional distillation. The aminoalcohol may be further purified by refractionation at atmospheric or reduced pressures, by fractional crystallization of certain of its salts, such as the oxalates or hydrochlorides, or in the case of the solid aminoalcohols, by fractional crystallization of the pure compounds from suitable solvents.

The following examples illustrate suitable procedures for the preparation of the aminoalcohols of this group:

Example I

One hundred and forty-nine parts by weight of 3-nitro-4-heptanol were mixed with 320 parts of methyl alcohol and 7½ parts of a nickel catalyst, prepared as described in the foregoing, and the mixture was introduced into a suitable pressure hydrogenation apparatus and sealed. Hydrogen was then introduced into the apparatus and maintained at a pressure of 400 pounds per square inch for 3½ hours at room temperature with constant agitation. At the conclusion of the hydrogenation the reaction mixture was removed from the hydrogenation apparatus and the catalyst separated from the solution by filtration. The solution was subjected to fractional distillation and 3-amino-4-heptanol distilled over in the fraction boiling at 105 to 110° C. at approximately 30 mm. of mercury pressure.

Example II

One hundred and twenty parts by weight of 3-nitro-3-methyl-4-heptanol, 400 parts of methanol, and 7½ parts of nickel catalyst were introduced into a suitable hydrogenation apparatus and sealed. Hydrogen was introduced into the apparatus and maintained at a pressure of 600 pounds per square inch for 4 hours at 30 to 50° C. with constant agitation. At the conclusion of the reaction the catalyst was separated from the solution by filtration. The solution was subjected to fractional distillation and 3-amino-3-methyl-4-heptanol was distilled over at approximately 30 mm. of mercury pressure.

The aminoalcohols of this group are either viscous colorless liquids or white crystalline solids at room temperature. They are all extremely stable at temperatures up to at least 200° C. and are soluble in the ordinary organic solvents such as ethyl alcohol, acetone, and benzene. Certain of them, e. g., 3-amino-2-methyl-4-heptanol, possess two asymmetric carbon atoms, and consequently exist in two racemic forms which may be separated in certain instances by physical methods. Thus, the boiling points and the melting points of certain of these compounds are not sharply defined and may vary to a certain extent depending on the particular aminoalcohol under consideration and to method of preparation and whether or not the compound exists as a mixture of its isomers. With the exception of the above-mentioned 3-amino-2-methyl-4-heptanol the aminoalcohols of this group exist as pure compounds or as mixtures of isomers which have nearly identical boiling points. The following physical properties were determined for the aminoalcohols of this group which were prepared as indicated in the above examples:

| | Boiling point at 760 mm. (corrected) ° C. | Melting point (corrected) ° C. | Refractive index 20° C. | Specific gravity 25/4 |
|---|---|---|---|---|
| 2-amino-3-hexanol | 186–187 | 35–37 | *1.4542 | *0.9188 |
| 2-amino-2-methyl-3-hexanol | 187–187.5 | 57–58 | | |
| 3-amino-4-heptanol | 201 | | 1.4511 | 0.8997 |
| 5-amino-4-octanol | 215–217 | 32–35 | **1.4486 | **0.8882 |
| 3-amino-3-methyl-4-heptanol | 205–208 | | 1.4538 | 0.8971 |
| 3-amino-2-methyl-4-heptanol | 210.5–211.5 | | 1.4495 | 0.8973 |
| 3-amino-2 methyl-4-heptanol (isomer) | 214–215 | 52 | | |

*Super-cooled liquid.
**Measured at 30° C. on super-cooled liquid.

Since the number of preparations of each compound examined was limited, it should be understood that while the properties given will be useful in identifying the compounds of our invention, we do not wish to limit ourselves to products having the exact properties listed.

The nitroalcohols used in preparing the aminoalcohols described above may be prepared by any suitable method for introducing the nitro group into an aliphatic compound. However, we prefer to prepare these compounds in accordance with the process of copending application Ser. No. 146,855 by Byron M. Vanderbilt, filed June 7, 1937. According to this process, a primary or secondary nitroparaffin and an aliphatic aldehyde are reacted in the presence of an auxiliary solvent, such as ethyl alcohol, and in the presence of an alkaline catalyst such as sodium hydroxide, the aldehyde being slowly added to a solution of the nitroparaffin and catalyst in the auxiliary solvent while thoroughly agitating.

The aminoalcohols of our invention are particularly useful as corrosion inhibitors in antifreeze solutions used in the cooling systems of internal combustion motors. For example, any of the aminoalcohols of my invention may be added to a water or water-alcohol solution in concentrations of from 0.1 to 1.0 percent and thereby substantially inhibit corrosion of the metal by the solution. They are also useful as intermediates for the preparation of numerous organic compounds and various other uses of these materials will be apparent to those skilled in the art.

Our invention now having been described, what we claim is:

1. An aminoalcohol of the formula:

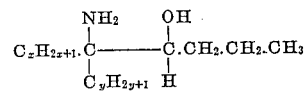

wherein $x$ is an integer, $y$ is a numeral selected from the class consisting of zero and integers, and $x+y$ is less than four.

2. An aminohexanol of the formula:

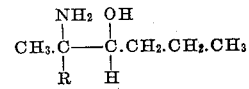

wherein R represents a member of the class consisting of H and $CH_3$.

3. 2-amino-2-methyl-3-hexanol.

4. An aminoheptanol of the formula:

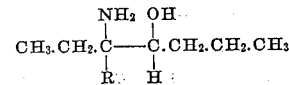

wherein R represents hydrogen or a methyl group.

5. An aminoalcohol of the formula:

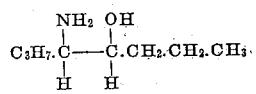

HENRY B. HASS.
BYRON M. VANDERBILT.